United States Patent
Kayani et al.

(10) Patent No.: US 8,826,537 B2
(45) Date of Patent: Sep. 9, 2014

(54) AEROFOIL STRUCTURE AND A METHOD OF MAKING A RIB FOR AN AEROFOIL STRUCTURE

(75) Inventors: Amir Kayani, Bristol (GB); Ian L Gray, Bristol (GB)

(73) Assignee: Airbus Operations Limited, Bristol (GB)

( * ) Notice: Subject to any disclaimer, the term of this patent is extended or adjusted under 35 U.S.C. 154(b) by 1138 days.

(21) Appl. No.: 12/680,915

(22) PCT Filed: Oct. 17, 2008

(86) PCT No.: PCT/GB2008/050947
§ 371 (c)(1),
(2), (4) Date: Mar. 31, 2010

(87) PCT Pub. No.: WO2009/053730
PCT Pub. Date: Apr. 30, 2009

(65) Prior Publication Data
US 2010/0209255 A1 Aug. 19, 2010

(30) Foreign Application Priority Data
Oct. 23, 2007 (GB) .................................. 0720704.6

(51) Int. Cl.
*G05B 19/4099* (2006.01)
*B64C 3/26* (2006.01)
*B64C 3/18* (2006.01)
*B64C 3/24* (2006.01)

(52) U.S. Cl.
CPC .............. *G05B 19/4099* (2013.01); *B64C 3/26* (2013.01); *G05B 2219/35062* (2013.01); *B64C 3/187* (2013.01); *G05B 2219/36248* (2013.01); *G05B 2219/45147* (2013.01); *B64C 3/24* (2013.01); *G05B 2219/37558* (2013.01)
USPC .................... 29/889.7; 29/889.71; 29/889.72; 29/407.05; 416/229 R; 416/230; 416/224; 416/226; 700/166; 700/169

(58) Field of Classification Search
USPC .......... 416/229 R, 229 A, 230, 224, 226, 232, 416/233, 241 A; 29/889.7, 889.71, 889.72, 29/407.05, 889.1, 889.2; 244/123.1, 244/123.14, 123.2, 123.4, 123.7, 123.8, 244/123.9; 700/166, 169
See application file for complete search history.

(56) References Cited

U.S. PATENT DOCUMENTS 1,808,842 A * 6/1931 Fedor ........................ 244/123.12
2,918,977 A * 12/1959 Fedan et al. ................... 416/233
(Continued)

FOREIGN PATENT DOCUMENTS

| EP | 1288754 A2 | 3/2003 |
| GB | 2409443 A | 6/2005 |

(Continued)

OTHER PUBLICATIONS

ISR for PCT/GB2008/050947 dated Feb. 2, 2009.
British Search Report for GB 0720704.6 dated Feb. 16, 2008.

*Primary Examiner* — Christopher Verdier
(74) *Attorney, Agent, or Firm* — Lowe Hauptman & Ham, LLP

(57) ABSTRACT

A method for making a rib for an aerofoil structure, the aerofoil structure including a skin component, the method including the steps of scanning the inner surface of the skin component to determine the surface profile thereof, providing a rib having a rib body and a rib foot protruding from the body, machining a foot surface profile into the rib foot, the foot surface profile being arranged to complement the skin inner surface profile where the rib foot is intended to abut the skin component.

6 Claims, 4 Drawing Sheets

(56) References Cited

U.S. PATENT DOCUMENTS

| | | | | |
|---|---|---|---|---|
| 3,950,113 | A | * | 4/1976 | Albrecht ............... 416/97 A |
| 5,033,014 | A | | 7/1991 | Carver et al. |
| 6,314,630 | B1 | * | 11/2001 | Munk et al. ............ 29/407.01 |
| 6,524,074 | B2 | * | 2/2003 | Farrar et al. ............ 416/229 R |

| | | | |
|---|---|---|---|
| 2004/0236454 | A1 | 11/2004 | Weisser |

FOREIGN PATENT DOCUMENTS

| | | |
|---|---|---|
| WO | 2004/077185 A2 | 9/2004 |
| WO | 2007/034197 A1 | 3/2007 |

\* cited by examiner

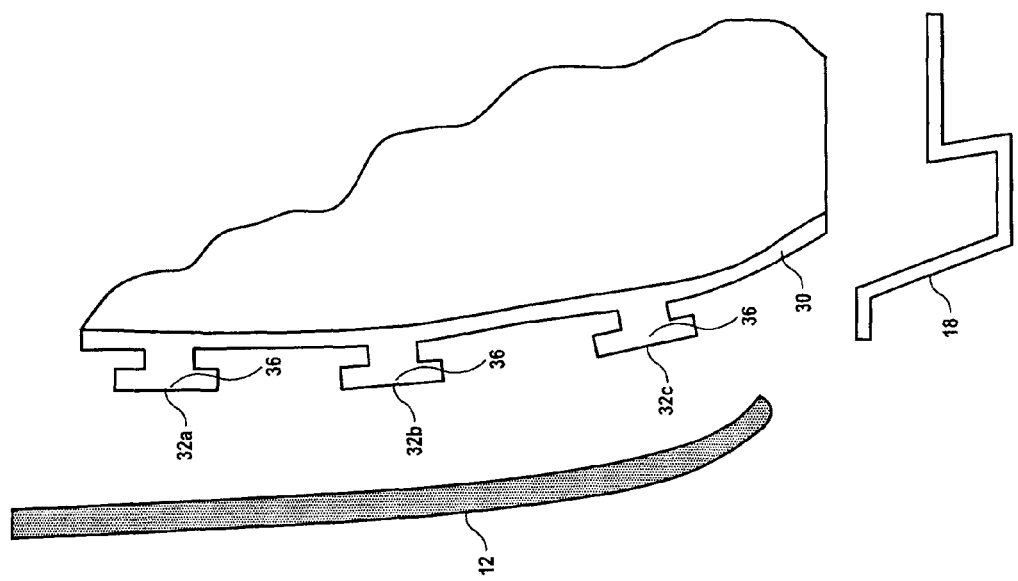

AEROFOIL STRUCTURE AND A METHOD OF MAKING A RIB FOR AN AEROFOIL STRUCTURE

RELATED APPLICATIONS

The present application is national phase of PCT/GB2008/050947, filed Oct. 17, 2008, and claims priority from, British Application Number 0720704.6, filed Oct. 23, 2007, the disclosures of which are hereby incorporated by reference herein in their entirety.

FIELD OF THE INVENTION

The present invention relates to aerofoil structures and a method of making a rib for an aerofoil structure, particularly although not exclusively where at least part of the aerofoil structure is made from a laid up fibre composite material.

BACKGROUND OF THE INVENTION

Generally component parts of assemblies are manufactured within acceptable levels of dimensional tolerance. Where components are made from a laid up or moulded fibre composite material it is common to have one surface which is tightly dimensionally controlled while the other surface is not so controlled. When such component parts are assembled together into a multi-part structural assembly, such as an aircraft wing, small clashes (interference fits) or gaps (clearance fits) can result. In the event of an interference fit some material must be removed whilst still retaining the structural integrity of the assembly. For a minimum weight optimised design that cannot be done unless additional material was included in the design for such a purpose. That can result in surplus material remaining part of the finished assembly when material removal is not required. For clearance fits, various options are available for filling the gap including liquid shimming and the insertion of a hard packer. As the thickness of the packer increases, there is an increasing likelihood that the structural integrity of the assembled component will be compromised as the joint will relax over time due to fatigue cycling and material creep, reducing the packer's shear transmission capability. Moreover, the use of packers adds weight to the final assembly which may be unnecessary.

SUMMARY OF THE INVENTION

The first aspect of the invention provides a method for making a rib for an aerofoil structure, the aerofoil structure comprising a skin component, the method comprising the steps of scanning the inner surface of the skin component to determine the surface profile thereof, providing a rib having a rib body and a rib foot protruding from the body, machining a foot surface profile into the rib foot, the foot surface profile being arranged to complement the skin inner surface profile where the rib foot is intended to abut the skin component.

In that way, by mapping the surface profile of the skin component, the rib foot can be specifically designed to complement the surface profile of the skin component in the region that it is intended to abut the skin component. Consequently, it is unnecessary to design the skin component with additional material as the rib foot is machined accordingly. Also, the use of a packer is unnecessary.

A further aspect of the invention provides an aerofoil structure comprising a skin component having an outer surface profile and an inner surface profile, and a rib, the rib having a rib body and rib foot protruding from the periphery of the body, the rib being arranged against the skin component so that the rib foot abuts the inner surface profile of the skin component, the rib foot having a foot surface profile which is machined to complement the inner surface profile of the skin component.

Further features of the above aspects of the invention are set out in the claims appended hereto.

BRIEF DESCRIPTION OF THE DRAWINGS

A method of making a rib for an aerofoil structure and an aerofoil structure in accordance with the above aspects of the invention will now be described with reference to the accompanying drawings, in which:

FIG. 4 is an enlarged view of part of FIG. 3 showing the interface between the rib feet and the inner surface profile of the skin of the aerofoil structure.

FIGS. 1 and 2 illustrate the steps in the method according to the first aspect of the invention.

A typical aerofoil structure comprises an opposed pair of skin components and an opposed pair of spars which join the skin components together. Skin components are elongate and generally define a gentle curve in section. In the present invention the skin components are made from a carbon fibre composite material. Spar components define a channel in section and they are elongate. The spar components are typically also made from carbon fibre composite. It should be noted that the present invention is applicable where manufacturing tolerance of individual components comprises the interface of those components. One skin component and one spar component are shown schematically in end elevation in FIG. 1.

Figure 1:
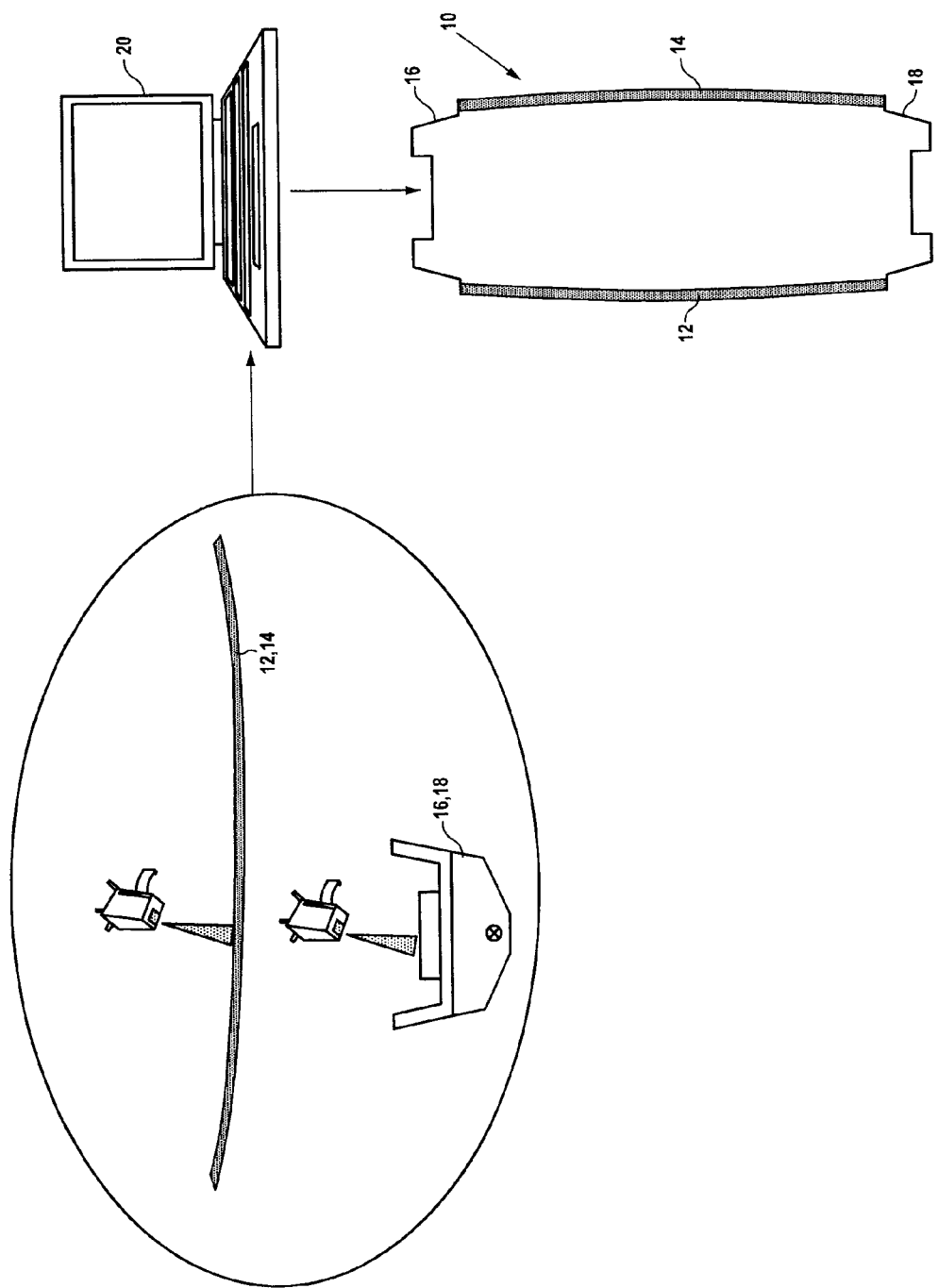
FIG. 1 is a schematic flow chart of part of the method of the first aspect of the invention.

A typical aerofoil structure sub-assembly is shown schematically in FIG. 1. The aerofoil structure sub-assembly 10 comprises first and second opposed skin components 12, 14 which are joined together and spaced apart by a pair of opposed spar components 16, 18.

As can be seen from the sub-assembly 10 in FIG. 1, when the skin components 12, 14 and spar components 16, 18 are assembled into a sub-assembly, a space envelope is defined into which a rib will be assembled on final assembly of the aerofoil structure so as to retain the skin components and spar components together in a structurally sound way.

Figure 2:
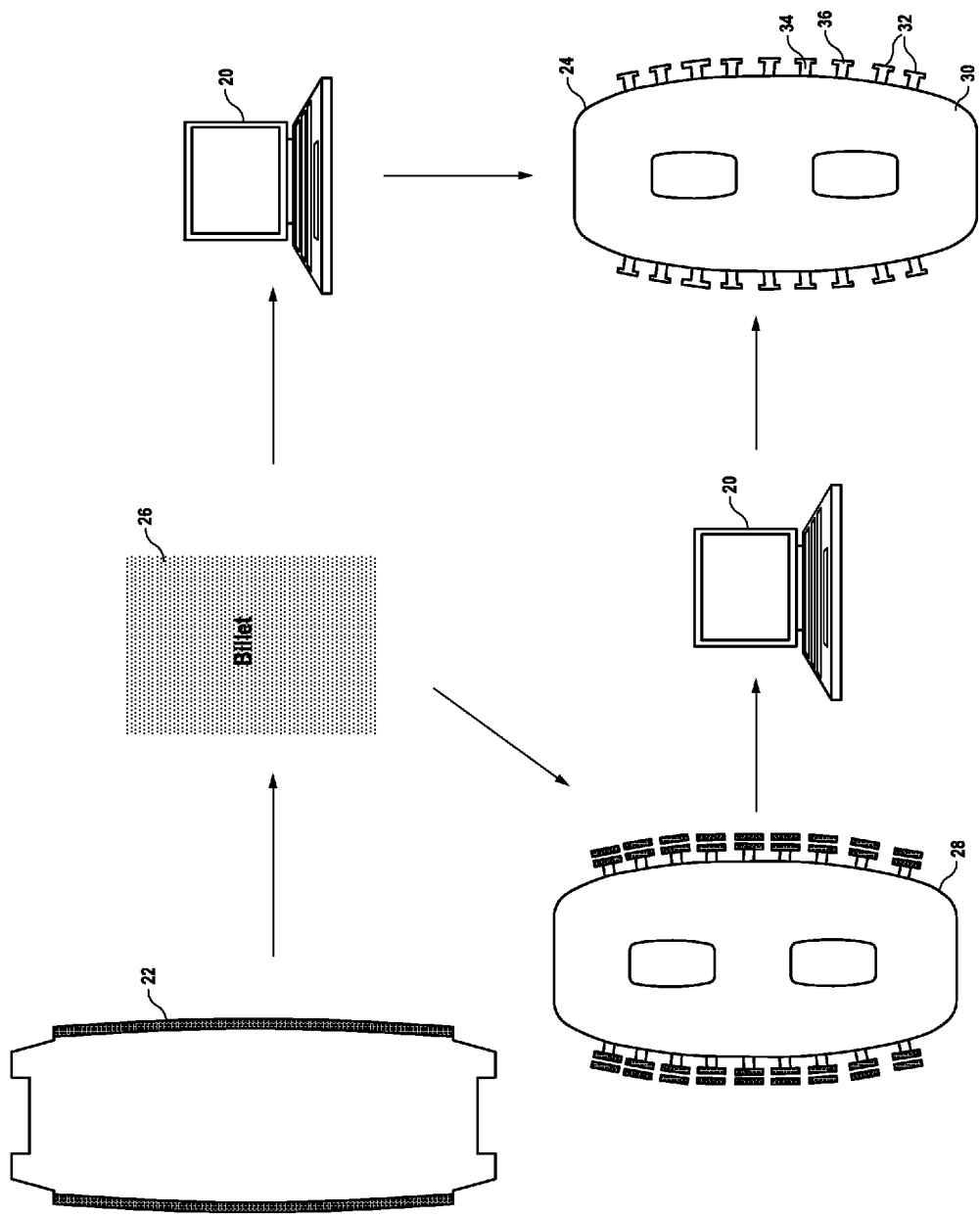
FIG. 2 is a schematic flow chart of the remainder of the method of FIG. 1.

In the method according to the present invention, the inner surface profiles of the skin and spar components 12-16 are scanned by an appropriate scanning mechanism, for example by laser scanning. That scanned profile data is passed to a CPU 20 which has appropriate computer-aided design software thereon. The CPU 20 virtually assembles the skin and spar components to define a virtual space envelope using the scanned surface profile data. The defined space envelope 22 is shown in FIG. 2 and that defined space envelope with the surface profile data can be passed to appropriate tooling employing computer-aided manufacturing in software to manufacture a rib 24 from a billet 26. Two alternative mechanisms for manufacturing the final rib form are envisaged. In one possible route the rib 24 is manufactured directly from the billet using the space envelope and surface profile data. Alternatively, an initial rib pre-form component 28 can be made and the space envelope and surface profile data in the CPU 20 can be used to finish the final rib form 24.

Because the space envelope 22 is known and the detailed surface profiles of the inner surface of the skin components 12, 14 and spar components 16, 18 are known, the rib can be manufactured to provide an optimum fit without the need for further removal of material or for packing whether by liquid shimming or hard packing. As illustrated in the final rib form 24 in FIG. 2, the rib comprises a rib body 30 and a series of rib feet 32. The rib feet 32 each comprise a leg 34 and a rib foot plate 36.

The rib foot plate 36 is dimensioned, positioned and angled so as to conform to the inner surface profile of the skin component 12, 14 against which it is intended to be arranged.

Where the rib 24 is first formed with additional material from the billet and material is machined away from the rib feet 32 (as shown in the lower part of FIG. 2), the space envelope and surface profile information in the CPU 20 is used to machine away material from the rib foot plates 36 so as to create rib feet which conform to the inner surface profile of the skin components 12, 14.

Figure 3:
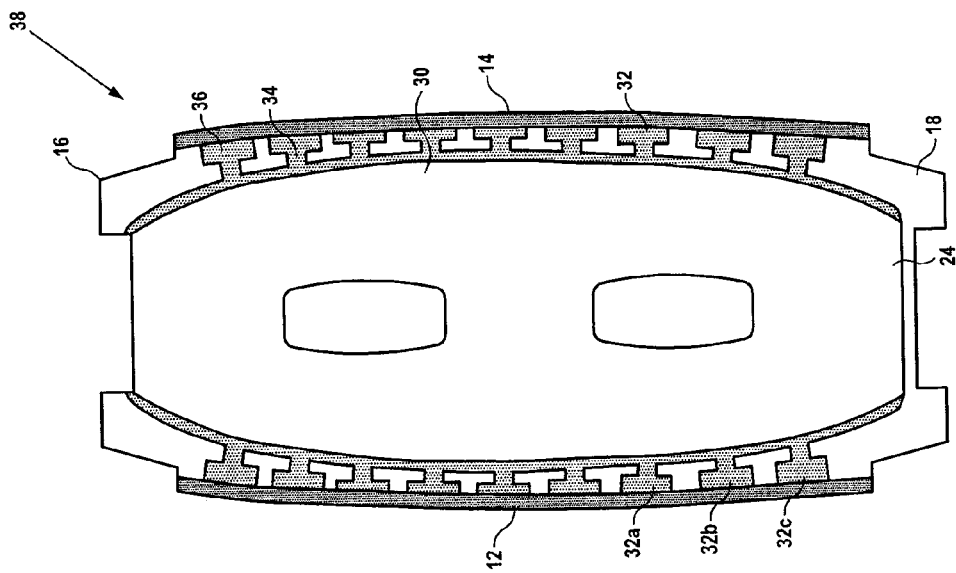
FIG. 3 is a schematic end elevation of an aerofoil structure according to a further aspect of the invention.

FIGS. 3 and 4 illustrate an aerofoil structure in accordance with the invention. Parts corresponding to parts in FIGS. 1 and 2 carry the same reference numerals. The aerofoil structure 38 comprises opposing gently curved skin components 12, 14 which are arranged concave relative to each other and spaced apart from each other. The skin components 12, 14 are spaced apart by means of spar components 16, 18 which are respectively connected to leading and trailing edges of the skin components 12, 14. The skin and spar components 12-18 are secured together and a rib 24 is arranged in the envelope defined by the skin and spar components. The rib 24 is dimensioned so as to fit with a tight tolerance between the spar components 16, 18. The rib 24 has a plurality of rib feet 32 extending from the lateral periphery of the rib body 30. Each rib foot 32 comprises a leg 34 and a rib foot plate 36. It can be seen from the rib feet 32a, b, c that the material which goes to make up the rib foot plate 36 can be machined so as to conform the surface profile of the rib foot plate 36 with the inner surface profile of the skin component 12, 14. As shown in FIG. 3, where the rib body 30 curves away from the inner surface of the skin component 12 as the rib 24 approaches the spar 18, less material is removed from the rib foot plates 36 of the ribs 32. Thus, the rib 32a has the most material removed from the rib foot plate and the rib 32c has the least material removed from the rib foot plate to ensure that all of the rib feet 32 abut the inside surface of the skin components 12, 14 without the need either for further material to be removed from the inner surface of the skin components 12, 14 or for an additional packer to be inserted into any space between the rib foot plates 36 and the inner surface profile of the skin components 12, 14. In FIG. 4, an alternative arrangement is shown in which the skin component 12 angles inwardly towards the spar component 18. It can be seen in FIG. 4 clearly that the rib foot plates 36 of the rib feet 32a, b, c are progressively angled so as remain substantially parallel with the curving inner surface profile of the skin component profile 12. Again, in this arrangement, the rib feet 32 can be arranged against the inner surface profile of the skin components 12, 14 and the spar components 16, 18 without the need either for further material removal from the inside surface of the components or for liquid or hard packed shimming.

Although the invention has been described above with reference to one or more preferred embodiments, it will be appreciated that various changes or modifications may be made without departing from the scope of the invention as defined in the appended claims. In particular, various scanning arrangements and computer-aided designs/computer-aided manufacture systems may facilitate the method of the present invention.

Also, although the invention is primarily of use in relation to skin components that are made from laid up composite fibre material, it may be appropriate for use in the systems that employ other materials for the skin and/or spar components.

The invention claimed is:

1. A method for making a rib for an aerofoil structure, the aerofoil structure comprising a skin component, the method comprising the steps of scanning the inner surface of the skin component to determine the surface profile thereof, providing the rib having a rib body and a rib foot protruding from the body, using scanned inner surface profile data from the skin component obtained from the step of scanning the inner surface of the skin component to machine a foot surface profile into the rib foot, the foot surface profile being arranged to complement the skin inner surface profile where the rib foot is intended to abut the skin component.

2. A method for making a rib according to claim 1, in which the rib has a plurality of rib feet, one or more of the feet having a foot surface profile and comprising the step of machining the or each respective foot surface profiles of the feet to complement the skin inner surface profile where the respective foot is intended to abut the skin component.

3. A method for making a rib according to claim 2 in which the aerofoil structure comprises two skin components and the foot surface profiles of the feet complement, respectively the inner surface profiles of the regions of the skin components where the feet are intended to abut.

4. A method for making a rib according to claim 1-in which the aerofoil structure has a spar component attached to the skin component, the method comprising the step of forming the rib to complement an inner surface profile of the spar component.

5. A method for making a rib according to claim 1 in which the aerofoil structure comprises an additional skin component having an inner surface profile, the skin components each having an outer surface profile, wherein the aerofoil structure further comprises first and second spar components arranged between the skin components whereby a space envelope is defined by the inner surface profiles of the skin components, and wherein the step of providing the rib comprises providing a rib having a rib body and a plurality of rib feet and the step of machining the foot surface profile comprises machining multiple foot surface profiles to complement the inner surface profiles of the skin components.

6. The method for making a rib according to claim 1, further the action of providing a plurality of ribs, wherein the ribs are part of a monolithic component.

\* \* \* \* \*